Inventors
WILLIAM A. SCHILB
NORMAN P. ALEXANDER
BY
Mueller, Aichele & Rauner
ATTYS.

Inventors
WILLIAM A. SCHILB
NORMAN P. ALEXANDER
BY
Mueller, Aichele & Rauner
ATTYS.

United States Patent Office
3,449,680
Patented June 10, 1969

3,449,680
TRANSISTOR PROTECTION CIRCUIT

William A. Schilb, Lombard, Ill., and Norman P. Alexander, Cheltenham, Gloucester, England, assignors to Motorola, Inc., Franklin Park, Ill., a corporation of Illinois Filed Mar. 29, 1966, Ser. No. 538,399
Int. Cl. H03g *11/04;* H03f *3/04*
U.S. Cl. 330—11 12 Claims

ABSTRACT OF THE DISCLOSURE

A protection circuit for semiconductors acts to limit the current in an amplifying stage by reducing the drive signal applied to the amplifying stage. The drive signal is regulated in response to any one or more of a combination of measured parameters as, for example, final amplifier current, output VSWR, supply voltage and amplifier transistor temperature.

Figure 1:
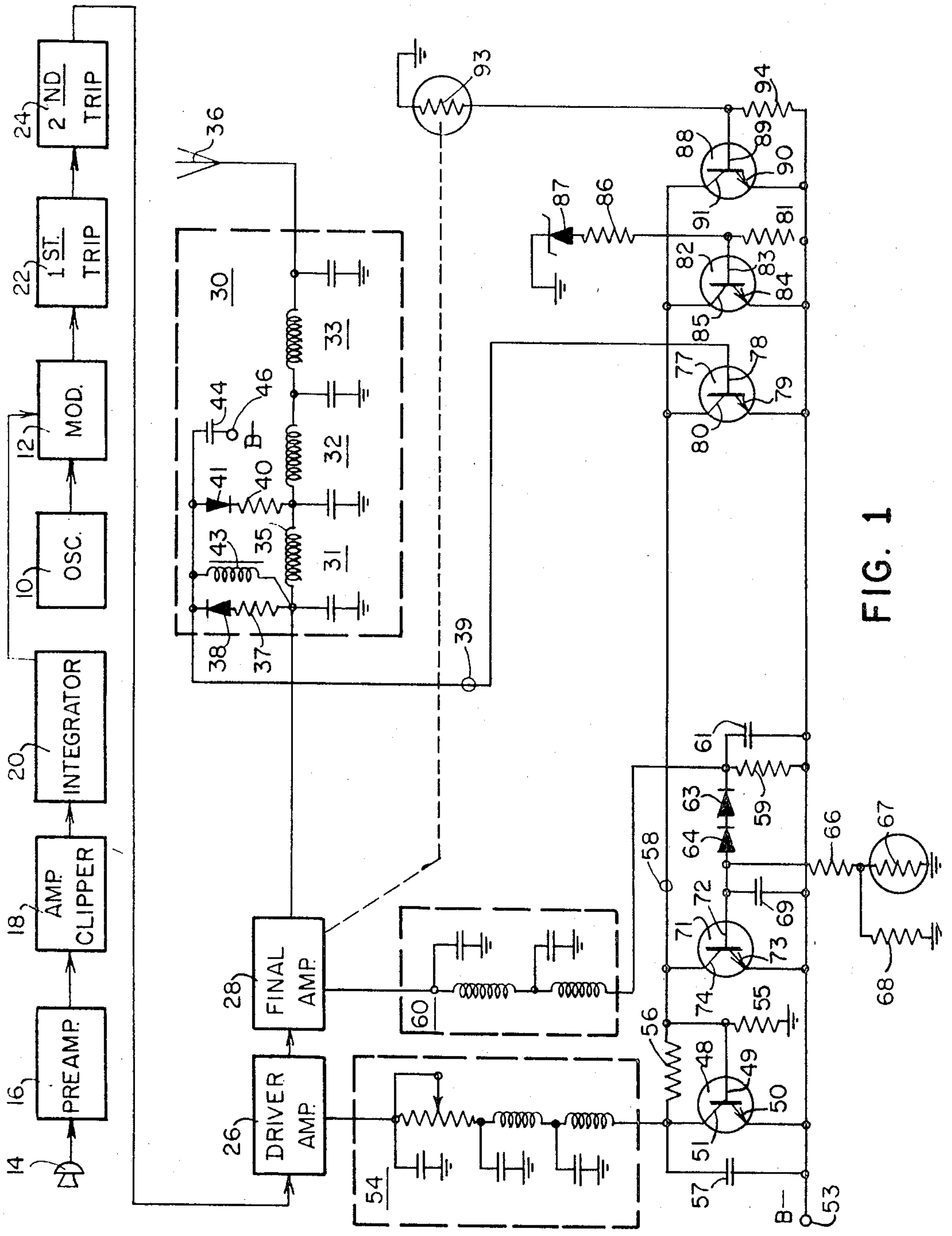

The development of transistors and other semiconductor components has made possible a reduction in the size and power consumption of electronic devices. In high power transistorized transmitters it is often necessary to operate the output stages at or near the maximum ratings of the transistors used in order to obtain optimum gain and power output. When such a transmitter is operated in the vicinity of other high power transmitters, signals from the nearby transmitters may induce voltages on the antenna of the transistorized transmitter. This voltage may be coupled back to the output amplifier transistor and added to the radio frequency voltage normally found at this point. This can occur even though the nearby high power transmitter is transmitting on a different frequency than that to which the transistorized transmitter is tuned. Since the voltage supplied to the final amplifier stages of the transmitter is as high as the ratings of the transmitter will permit, the addition of the voltage induced on the antenna may cause the voltage appearing at the output of the output amplifier transistor to exceed its maximum rating and the transistor may break down. If breakdown occurs, the resulting heavy current flowing through the transistor may cause it to burn out.

Mistuning of the output circuit of the transmitter or removal or shorting of the antenna circuit can cause a high VSWR to develop on the transmission line coupling the output amplifier to the antenna. This high VSWR can cause the voltage appearing across the output amplifier transistor to become sufficiently high to cause voltage breakdown of the amplifier and transistor, and thus excessive current.

The transistors of the transmitter output amplifier also may need to be protected against overheating and increases in power supply voltage. An increase in the power supply voltage can cause excessive power dissipation in the transistor and unless the drive voltage to the transistor is reduced to reduce the power dissipation, destruction of the transistor may result. The transistor is also subject to destruction or damage if it becomes overheated.

Since the conditions under which a transistor may be required to operate differ, it is not necessary to provide protection against all of the above problems for each transmitter. It is, therefore, desirable to have a protective circuit which can easily be modified to include the protection features desired for the particular transmitter under consideration.

It is therefore an object of this invention to provide a transistor amplifier with an improved protective circuit which will limit the drive signals supplied to the amplifier to a safe value while maintaining the power output of the amplifier at a high level.

Another object of this invention is to provide a transistor amplifier with protective circuit wherein the drive signal to the amplifier is limited to limit the current through the amplifier transistor.

Another object of this invention is to provide a transistor amplifier with a protective circuit in which the drive signal to the amplifier is regulated in response to the VSWR at the output of the transistor amplifier.

A further object of this invention is to provide a transistor amplifier with a protective circuit in which the drive signal to the amplifier is regulated in response to changes in the supply voltage.

Another object of this invention is to provide a transistor amplifier with a protective circuit in which the drive signal to the amplifier is regulated in response to the temperature at a particular location in the transmitter.

A feature of this invention is the provision of a protective circuit for a transistor amplifier wherein a current sensor measures the current supplied to the amplifier to produce a bias current. A control amplifier provides an operating current for a driver amplifier and is responsive to the bias current from the current sensor to regulate the drive amplifier operating current and thus the drive signal supplied to the transistor output amplifier.

Another feature of this invention is the provision of a protective circuit for a transistor amplifier wherein a VSWR sensor is coupled to a transmission line which is coupled to the amplifier output. The VSWR sensor develops a bias voltage in response to the VSWR of the transmission line at the amplifier output and further, in response to this bias voltage, develops a bias current which is applied to the control amplifier to regulate the operating current supplied to the drive amplifier.

Another feature of this invention is the provision of a protective circuit for a transistor amplifier wherein a voltage sensor is coupled to the power supply of the transmitter and is responsive to the supply voltage, above a predetermined magnitude, to provide a bias current for the control amplifier.

Another feature of this invention is the provision of a protective circuit for a transistor amplifier wherein a temperature sensor has a temperature sensitive element which is positioned at a desired location in the transmitter. The temperature sensitive element is responsive to the temperature at that location to produce a bias voltage. The temperature sensor is responsive to this bias voltage to provide a bias current for the control amplifier.

Another feature of this invention is the provision of a protective circuit for a transistor amplifier wherein the bias currents supplied by the current sensor, the VSWR sensor, the voltage sensor and the temperature sensor are coupled in parallel to the control amplifier whereby the driver amplifier operating current is simultaneously regulated by the bias currents developed in each of the sensors.

Figure 2:
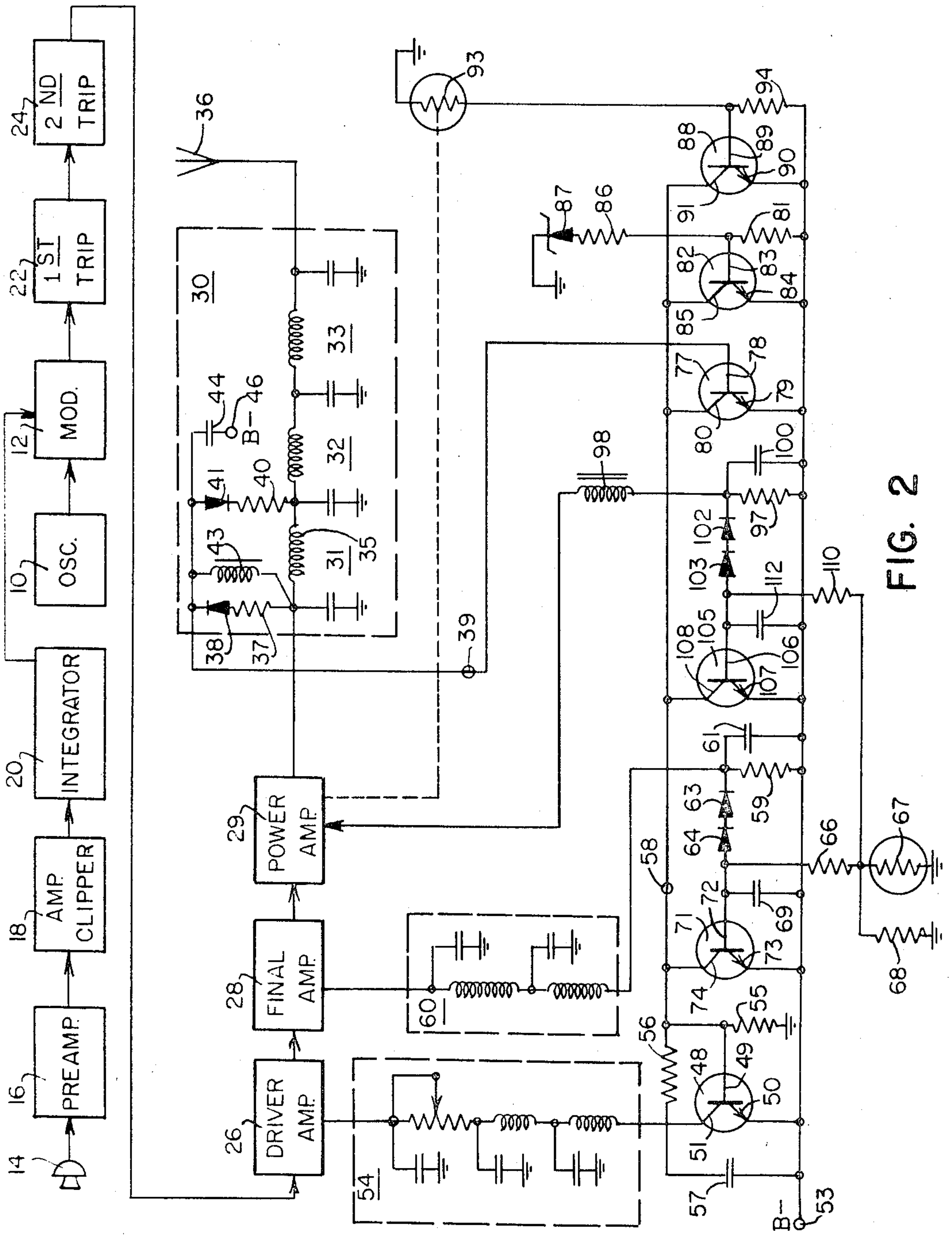

The invention is illustrated in the drawings wherein:

FIG. 1 is a partial schematic and partial block diagram of a transmitter incorporating the protective features of the invention; and FIG. 2 is a partial block diagram and partial schematic diagram of another embodiment of the circuit of FIG. 1.

In practicing this invention a transistor protection circuit is incorporated in a carrier wave transmitter which includes a transistor amplifier for amplifying a drive signal applied thereto and a driver coupled to the transistor amplifier for supplying the drive signal thereto. An output circuit is coupled to the transistor amplifier and includes an antenna and a transmission line, including a harmonic filter, coupling the transistor amplifier to the antenna. A control transistor is provided for supplying an operating current to the driver transistor. The driver operating current is regulated by varying the bias current supplied to the control transistor, to limit the driver output signal to a safe value. A current sensing means supplies an operating current to the transistor amplifier. The current sensing means is responsive to the magnitude of the current drawn by the transistor amplifier to develop a bias current for the control transistor and thereby regulate the operating current supplied to the driver means.

Other sensing means may be coupled in parallel with the current sensing means with each sensing means acting to provide bias current to the control transistor in accordance with the magnitude of the parameter measured. The additional sensing elements may include, but are not limited to, supply potential sensing means, VSWR sensing means and temperature sensing means. The output bias current of each of the sensors is coupled to the control amplifier so that each of the sensors simultaneously acts to regulate the operating current supplied to the driver, and thus the drive signal applied to the transistor amplifier. The protection circuit is easily adapted to use as many of the sensing circuits as is required by the transmitter application.

Referring to FIG. 1, there is shown a transistor amplifier incorporating the protective features of this invention. The transmitter includes an oscillator 10 for generating a carrier wave signal which is coupled to modulator 12. Microphone 14 is used to receive voice signals which are converted to electrical signals and amplified in pre-amplifier 16 and amplifier clipper 18. The audio signals are further integrated in integrator 20 and coupled to modulator 12 to modulate the carrier wave signal. The resulting signal is amplified and tripled in frequency in first tripler 22 and again tripled in frequency in second tripler 24. The output of second tripler 24 is coupled to driver amplifier 26 where it is amplified and the resulting drive signal is coupled to final transistor amplifier 28. Final transistor amplifier 28, which includes one or more transistors for amplifying the drive signal, is coupled to antenna 36 by filter circuit 30. Filter circuit 30 includes filter sections 31, 32 and 33, which act as harmonic filters to prevent the radiation of harmonics above the first harmonic.

Operating current for driver amplifier 26 is provided from supply terminal 53, which receives a supply potential and a supply current from a power supply (not shown), through transistor 48 and radio frequency filter 54. By regulating the magnitude of the operating current supplied to driver amplifier 26, the magnitude of the drive signal applied to final transistor amplifier 28 is regulated.

With no bias current supplied from any of the sensing elements of the circuit, the bias for control amplifier transistor 48 is provided from a reference potential through resistor 55 to base 49 of transistor 48 and through resistance 56 from driver amplifier 26. Emitter 50 of transistor 48 is coupled to supply terminal 53 and the base emitter current flowing through transistor 48 biases transistor control amplifier 48 to conduction. The operating current for driver amplifier 26 flows through emitter 50, collector 51 and filter 54 to driver amplifier 26. Capacitor 57 acts as a radio frequency bypass to prevent the generation of spurious signals in the direct current supply.

Base 49 of transistor 48 is coupled to bias current conductor 58 and receives a bias current therefrom to regulate the conduction of control transistor 48. An increase in the bias current in bias current conductor increases the current flowing from the reference potential through resistor 55, and thus decreases the bias current supplied to base 49 to thereby reduce the conduction of transistor 48.

An operating current for final transistor amplifier 28 is provided from supply terminal 53 through resistor 59 and filter circuit 60. Capacitors 61 and 69 act as RF bypass capacitors. A current sensing transistor 71 is provided to supply a bias current to bias current conductor 58 in proportion to the magnitude of the current drawn by final transistor amplifier 28. The bias potential for transistor 71 is provided by current flowing through resistors 67 and 68 coupled in parallel, resistor 66, diodes 64 and 63 and resistor 59.

As the current drawn by final transistor amplifier 28 increases, the potential across the resistor 59 increases, thus causing the potential supply to base 72 of transistor 71 to increase. The increase in potential at base 72 of transistor 71 causes the conduction of transistor 71 to increase, thereby increasing the bias current supplied to bias current conductor 58. The increase in bias current supplied to bias current conductor 58 causes the conduction of control transistor 48 to be reduced, thereby reducing the operating current supplied to driver amplifier 26 as previously described.

A VSWR sensor is provided across inductance 35 of filter section 31. The input and output points of filter section 31 are a quarter wave length apart and thus the voltage difference between these points provides an indication of the VSWR at the output of final transistor amplifier 28. The input and output points of filter section 31 are coupled to bias line 39 through resistor 37 and diode 38 and resistor 40 and diode 41. Inductance 43 provides a return path for the diode current while blocking the RF potential present on the transmission line. Bias line 39 is coupled to the B− terminal 46 through capacitor 44 to provide an RF bypass. Diodes 38 and 41 are poled to provide a positive potential on bias line 39 if the antenna 36 is shorted. The magnitude of the positive potential developed on bias line 39 is a function of the VSWR in filter section 31.

Bias line 39 is coupled to base 78 of transistor 77 and an increase in the positive potential supplied to transistor 77 increases the conduction of transistor 77 so that the bias current flowing in bias current conductor 58 increases. As previously described the increase in bias current in bias current conductor 58 reduces the conduction of control transistor 48 and thus the drive signal from driver amplifier 26 to final amplifier 28 is reduced.

A voltage sensor, transistor 82, is shown which is responsive to the potential at supply terminal 53. Transistor 82 is normally biased to non-conduction as no current flows through resistor 81 due to the blocking action of Zener diode 87. If the potential at supply terminal 53 increases negatively above a predetermined magnitude, Zener diode 87 conducts causing a flow of current from the reference potential through Zener diode 87, resistors 86 and 81 to supply terminal 53. The resulting increase in potential on base 83 of transistor 82 biases transistor 82 to conduction. As the potential at supply terminal 53 increases above the potential at which conduction of Zener diode 87 takes place, the current flowing through resistor 81 increases, thus increasing the conduction of transistor 82. The increase in conduction of transistor 82 causes the bias current flowing in bias current conductor 58 to increase, thus decreasing the operating current applied to driver amplifier 26 as previously described.

A temperature sensing device is shown which consists of a temperature sensitive resistor 93 coupled as part of the biasing circuit for transistor 88. Temperature sensitive resistor 93 may be placed at any desired location in the transmitter and would normally be positioned on the case of the transistors of the final transistor amplifier to measure their temperatures as accurately as possible. As the temperature of temperature sensitive resistor 93 increases its resistance decreases, thus increasing the current flowing through temperature sensitive resistance 93 and resistor 94 to increase the bias potential at base 89 of transistor 88. The increase in the bias potential on base 89 increases the conduction of transistor 88. The increase in current through transistor 88 increases the bias current in bias current conductor 58 thereby reducing the operating current supplied to driver amplifier 26.

In the circuit of FIG. 1 four sensors have been provided, each of which acts independently of the others to control the bias current supplied to control transistor 48 and thus the operating current supplied to driver amplifier 26. Thus the transistors of final transistor amplifier 28 may be protected simultaneously from damage caused by one or more operating parameters exceeding their maximum allowable limits. While the circuit of FIG. 1 has been shown with four different sensors, it is not necessary to limit the circuit to four. More sensors can be added in parallel to regulate the bias current supplied to control transistor 48. In addition, fewer than four amplifier sensors can be used if this is desired.

Referring to FIG. 2 there is shown a partial schematic and partial block diagram of a second embodiment of the invention. Portions of FIG. 2 identical to FIG. 1 have the same reference numerals. In the embodiment of FIG. 2 an additional amplifier, power transistor amplifier 29, has been coupled to final transistor amplifier 28. Power transistor amplifier 29 may include one or more transistors and receives an output signal from final transistor amplifier 28 and further amplifies it to provide additional power output for the transmitter. An additional current sensing element has been provided in FIG. 2 and is responsive to the operating current drawn by power transistor amplifier 29 to regulate the bias current supplied to control transistor 48 and thus the operating current supplied to driver amplifier 26. Operating current for power transistor amplifier 29 is provided from supply terminal 53 through resistor 97 and inductance 98. The bias potential for base 106 of current sensing transistor 105 is provided by a current flowing from a reference potential through resistors 67 and 68 connected in parallel, resistor 110, diodes 102 and 103 and resistor 97 to supply terminal 53. Capacitors 100 and 112 act as RF bypass capacitors.

As the current drawn by power transistor amplifier 29 increases, the potential across resistor 97 increases, thus increasing the potential on base 106 of transistor 105. As the potential on base 106 of transistor 105 increases the conductance of transistor 105 increases and the current flowing in bias current conductor 58 also increases. Current sensing transistor 105 acts in the same manner as current sensing transistor 71, previously described in connection with FIG. 1, to regulate the bias current flowing in bias current conductor 58. The increase in bias current flowing in bias current conductor 58 decreases the conduction of transistor 48, in the manner previously described, thus reducing the operating current supplied to driver amplifier 26 and the drive signal therefrom.

Thus, a transistor protection circuit has been described in which one or a plurality of sensing elements may be used to simultaneously control the drive signal supplied to the transistors which are being protected. Different parameters, which may cause transistor operating failures, may be measured independently and the results combined to regulate the magnitude of the drive signal to protect the transistors receiving the drive signal.

What is claimed is:

1. In a carrier wave transmitter including transistor amplifier means for amplifying a drive signal applied thereto, driver transistor means coupled to the transistor amplifier means for suplying the drive signal, and output circuit means coupled to the transistor amplifier means for receiving and translating the amplified drive signal, a protection circuit including in combination, supply terminal means adapted to receive a supply current including first and second operating currents, control transistor means having an input electrode coupled to said supply terminal means for receiving said first operating current therefrom, an output electrode coupled to the driver transistor means for supplying said first operating current thereto and a control electrode, current sensing means coupled to said supply terminal means for receiving said second operating current therefrom and coupled to the transistor amplifier means for supplying said second operating current thereto said current sensing means further being coupled to said control electrode and being responsive to said second operating current to develop a bias current having a magnitude determined by the magnitude of said second operating current, said control transistor means being responsive to said bias current to vary said first operating current and thereby to vary the magnitude of the drive signal, an increase in the magnitude of said second operating current above a predetermined magnitude resulting in a decrease in the magnitude of said first operating current and the drive signal whereby said second operating current is limited to a safe value.

2. The protection circuit of claim 1 wherein said control transistor means includes a control transistor having an emitter electrode coupled to said supply terminal means, a collector electrode coupled to the driver amplifier means and a base electrode, and first resistance means coupling said base electrode of said control transistor to a reference potential, said current sensing means includes a current sensing transistor having a collector electrode coupled to said base electrode of said control transistor, an emitter electrode coupled to said supply terminal means and a base electrode, said current sensing means further including second resistance means coupling said supply terminal means to the transistor amplifier means for supplying said second current thereto, said second resistance means being responsive to said second operating current to develop a first bias voltage thereacross proportional to said second operating current, first circuit means coupling said base electrode of said current sensing transistor to said reference potential and second circuit means coupling said second resistance means to said base electrode of said current sensing transistor, said first and second circuit means being responsive to said first bias voltage to develop a second bias voltage at said base electrode of said current sensing transistor, said current sensing transistor being responsive to said second bias voltage to vary said bias current at said base electrode of said control transistor whereby the magnitude of said first current is regulated.

3. The protection circuit according to claim 2 wherein said first circuit means includes third resistance means coupling said base electrode of said current sensing transistor to said reference potential and said second circuit means includes diode means coupling said base electrode of said current sensing transistor to said second resistance means.

4. In a carrier wave transmitter including transistor amplifier means for amplifying a drive signal applied thereto, driver amplifier means coupled to the transistor amplifier means for supplying the drive signal, and output circuit means coupled to the transistor amplifier means for receiving and translating the amplified drive signal, a protection circuit including in combination, supply terminal means adapted to receive a supply potential and a supply current including first and second operating currents, a bias current conductor, control transistor means having an input electrode coupled to said supply terminal means for receiving said first operating current therefrom, an output electrode coupled to the driver transistor means for supplying said first operating current thereto and a control electrode coupled to said bias current conductor, a plurality of sensing means each having an input coupled to said supply terminal means and an output coupled to said bias current conductor, a plurality of circuit means each coupling a separate one of said sensing means to separate predetermined portions of the transmitter, each of said sensing means acting to measure the magnitude of a particular parameter at the predetermined circuit portion to which it is coupled and being responsive to said magnitude of said particular parameter to supply a bias current to said bias current conductor with the total magnitude of said bias current in said bias current conductor being proportional to said magnitudes of said particular parameters, said control transistor means being responsive to the total magnitude of said bias current in said bias current conductor to vary said first operating current, whereby the drive signal is regulated to a safe value.

5. The protection circuit of claim 4 wherein said plurality of sensing means include voltage standing wave ratio measuring means coupled to the output circuit means and responsive to the amplified drive signal in the output circuit means to measure the voltage standing wave ratio thereof and to produce a first bias signal proportional thereto, first bias current control means having an input terminal coupled to said supply terminal means, a control terminal coupled to said voltage standing wave ratio measuring means and an output terminal coupled to said bias current conductor, said first bias current control means being responsive to said first bias signal to supply a first bias current proportional thereto to said bias current conductor, current sensing means having an input coupled to said supply terminal means for receiving said second operating current therefrom, and coupled to the transistor amplifier means for supplying said second operating current thereto, said current sensing means further being coupled to said bias current conductor, said current sensing means being responsive to the magnitude of said second operating current to supply a second bias current proportional thereto to said bias current conductor, said control transistor means being responsive to the total magnitude of said first and second bias currents in said bias current conductor to vary said first operating current, whereby the magnitude of the drive signal is regulated to a safe value.

6. The protection circuit of claim 4 wherein said plurality of sensing means includes at least one current sensing means, said one current sensing means including, resistance means coupling said supply terminal means to the transistor amplifier means for supplying a second operating current thereto, a current sensing transistor having an emitter electrode coupled to said supply terminal means, a collector electrode coupled to said bias current conductor for supplying a bias current thereto and a base electrode, circuit means coupling said base electrode of said current sensing transistor to said resistance means, said current sensing transistor being responsive to the magnitude of said second operating current to vary the magnitude of said bias current supplied to said bias current conductor.

7. The protection circuit of claim 4 wherein said plurality of sensing means include voltage standing wave ratio measuring means coupled to the output circuit means and responsive to the amplified drive signal in the output circuit means to measure the voltage standing wave ratio thereof and to produce a first bias signal proportional thereto, first bias current control means having an input terminal coupled to said supply terminal means, a control terminal coupled to said voltage standing wave ratio measuring means and an output terminal coupled to said bias current conductor, said first bias control means being responsive to said first bias signal to supply a first bias current proportional thereto to said bias current conductor, second bias current control means having input and control terminals coupled to said supply terminal means and an output terminal coupled to said bias current conductor, said second bias current control means being responsive to said supply potential to supply a second bias current proportional thereto to said bias current conductor, temperature sensing means adapted to be positioned at a desired location in the carrier wave transmitter, said temperature sensing means being responsive to the temperature at said desired location to develop a second bias signal proportional thereto, third bias control means having an input terminal coupled to said supply terminal means, a control terminal coupled to said temperature sensing means and an output terminal coupled to said bias current conductor, said third bias control means being responsive to said second bias signal to supply a third bias current proportional thereto to said bias current conductor, current sensing means coupled to said supply terminal means for receiving said second operating current therefrom and coupled to the transistor amplifier means for supplying said second operating current thereto said current sensing means further being coupled to said bias current conductor and being responsive to the magnitude of said second operating current to supply a fourth bias current proportional thereto to said bias current conductor, said control transistor means being responsive to the total magnitude of said first, second, third and fourth bias currents in said bias current conductor to vary said first operating current, whereby the magnitude of the drive signal is regulated to a safe value.

8. The protection circuit of claim 7 wherein said voltage standing wave ratio measuring means includes a common terminal, first and second diodes respectively coupled between said common terminal and separate points in the output circuit means with said separate points being positioned a quarter wave length apart, said first and second diodes being responsive to the voltage at said separate points to produce at said common terminal said first bias signal, said first bias current control means including a first transistor having an emitter electrode coupled to said supply terminal means, a collector electrode coupled to said bias current conductor and a base electrode coupled to said common terminal, said first transistor being responsive to said first bias signal to supply said first bias current to said bias current conductor, said second bias current control means includes first resistance means coupled to said supply terminal means, a second transistor having an emitter electrode coupled to said supply terminal means, a collector electrode coupled to said bias current conductor and a base electrode coupled to said first resistance means, Zener diode means coupling said base electrode of said second transistor to a reference potential, said Zener diode means being responsive to said supply potential above a predetermined magnitude to conduct whereby said second transistor is biased to conduction to regulate said second bias current supplied to said bias current conductor, said temperature sensing means including temperature sensitive resistance means positioned at a desired location at the transmitter and coupled to said reference potential, said third bias control means includes second resistance means coupled to said supply terminal means, and third transistor means having an emitter electrode coupled to said supply terminal means, a collector electrode coupled to said bias current conductor and a base electrode coupled to said second resistance means and said temperature sensitive resistance means, said temperature sensitive resistance means being responsive to the temperature at said desired location to vary said second bias signal whereby said third transistor supplies said third bias current to said bias current conductor in proportion to said temperature, said current sensing means including third resistance means coupling said supply terminal means to the transistor amplifier for supplying said second operating current thereto, a fourth transistor having an emitter electrode coupled to said supply terminal means, a collector electrode coupled to said bias current conductor and a base electrode coupled to said third resistance means and said reference potential, said fourth transistor being responsive to the magnitude of said second operating current to regulate said fourth bias current supplied to said bias current conductor.

9. The protection circuit of claim 7 wherein said voltage standing wave ratio measuring means includes a common terminal, first and second diodes respectively coupled between said common terminal and separate points in the output circuit means with said separate points being positioned a quarter wave length apart, said first and second diodes being responsive to the voltage at said separate points to produce at said common terminal said first bias signal, said first bias current control means including a first transistor having an emitter electrode coupled to said supply terminal means, a collector electrode coupled to said bias current conductor and a base electrode coupled to said common terminal, said first transistor being responsive to said first bias signal to supply said first bias current to said bias current conductor, said current sensing means including resistance means coupling said supply terminal means to the transmitter amplifier for supplying said second operating current thereto, a second transistor having an emitter electrode coupled to said supply terminal means, a collector electrode coupled to said bias current conductor and a base electrode coupled to said resistance means and said reference potential, said second transistor being responsive to the magnitude of said second operating current to regulate said second bias current supplied to said bias current conductor.

10. In a carrier wave transmitter including first transistor amplifier means and second transistor amplifier means coupled thereto for amplifying a drive signal applied to said first transistor amplifier means, driver means coupled to the first transistor amplifier means for supplying the drive signal, and output circuit means coupled to the second transistor amplifier means for receiving and translating the amplified drive signal, a transistor protection circuit including in combination, supply terminal means adapted to receive a supply current including first, second and third operating currents, a bias current conductor, control transistor means having an input electrode coupled to said supply terminal means, an output electrode coupled to the driver means for supplying said first operating current thereto and a control electrode coupled to said bias current conductor, first and second current sensing means each coupled to said supply terminal means, said first and second current sensing means further being coupled to the first and second transistor amplifier means respectively for supplying said second operating current to the first transistor amplifier means and said third operating current to the second transistor amplifier means, said first and second current sensing means each having output means coupled to said bias current conductor, said first current sensing means being responsive to said second operating current to develop a first bias current having a magnitude determined by the magnitude of said second operating current and said second current sensing means being responsive to said third operating current to develop a second bias current having a magnitude determined by the magnitude of said third operating current, said control transistor means being responsive to said first and second bias currents to vary said first operating current and thereby to vary the magnitude of the drive signal whereby said second and third operating currents are limited to a safe value.

11. The protection circuit of claim 10 wherein said control transistor means includes, first resistance means coupled to a reference potential, a first transistor having an emitter electrode coupled to said supply terminal means, a collector electrode coupled to the driver means for supplying said first operating current thereto and a base electrode coupled to said first resistance means and said bias current conductor, said first and second current sensing means including second and third resistance means respectively coupled to said supply terminal means, first circuit means coupling said second resistance means to the first transistor amplifier means for supplying said second operating current thereto, second circuit means coupling said third resistance means to the second transistor amplifier means for supplying said third operating current thereto, second and third transistors each having an emitter electrode coupled to said supply terminal means, a collector electrode coupled to said bias current conductor and a base electrode, third circuit means coupling said base electrode of said second transistor to said second resistance means and a reference potential, fourth circuit means coupling said base electrode of said third transistor to said third resistance means and said reference potential, said second and third transistors being responsive to said second and third operating currents respectively to vary the magnitude of said first and second bias currents.

12. A protection circuit for a transistor amplifier having an input circuit and driver circuit means coupled to the input circuit for providing a drive signal to the transistor amplifier, said transistor circuit including in combination, current supply terminal means, a first transistor having a first electrode coupled to said supply terminal means, a second electrode coupled to the driver circuit means and a third electrode, a second transistor having a first electrode coupled to said supply terminal means, a second electrode coupled to said third electrode of said first transistor and a third electrode, first resistance means having a first terminal coupled to said supply terminal means and a second terminal coupled to the transistor amplifier, second resistance means coupling said third electrode of said first transistor to a reference potential and third resistance means coupling said third electrode of said second transistor to said reference potential and diode means coupling said third electrode of said second transistor to said second terminal of said first resistance means.

References Cited

UNITED STATES PATENTS 3,323,065 5/1967 O'Connor -------- 307—202 X

NATHAN KAUFMAN, *Primary Examiner.*

U.S. Cl. X.R.

330—26, 24